US011907922B2

(12) United States Patent
Clemson

(10) Patent No.: US 11,907,922 B2
(45) Date of Patent: Feb. 20, 2024

(54) PRINT-ON-DEMAND BESPOKE WRAPPING PAPER VENDING MACHINE

(71) Applicant: Wesley Clemson, Manchester (GB)

(72) Inventor: Wesley Clemson, Manchester (GB)

( * ) Notice: Subject to any disclaimer, the term of this patent is extended or adjusted under 35 U.S.C. 154(b) by 291 days.

(21) Appl. No.: 17/355,875

(22) Filed: Jun. 23, 2021

(65) Prior Publication Data

US 2021/0406854 A1 Dec. 30, 2021

(30) Foreign Application Priority Data

Jun. 29, 2020 (GB) ..................................... 2009867

(51) Int. Cl.
| G06Q 20/18 | (2012.01) |
| B41J 3/407 | (2006.01) |
| B65C 9/40 | (2006.01) |
| G07F 11/66 | (2006.01) |

(52) U.S. Cl.
CPC ............ *G06Q 20/18* (2013.01); *B41J 3/4075* (2013.01); *B65C 9/40* (2013.01); *G07F 11/66* (2013.01)

(58) Field of Classification Search
None
See application file for complete search history.

(56) References Cited

U.S. PATENT DOCUMENTS

| 2002/0095237 A1 | 7/2002 | Parry |
| 2003/0166443 A1 | 9/2003 | May |
| 2014/0081451 A1* | 3/2014 | Repp ...................... G06Q 20/18 700/233 |

OTHER PUBLICATIONS

Examination Report received in corresponding Great Britain patent application No. 2009867.9, dated Feb. 17, 2021, 5 pages.
Search Report received in corresponding Great Britain patent application No. 2009867.9, dated Dec. 16, 2020, 1 page.

* cited by examiner

*Primary Examiner* — Joshua D Zimmerman
(74) *Attorney, Agent, or Firm* — DAY PITNEY LLP; Anthony A. Kassas

(57) ABSTRACT

A print on demand bespoke wrapping paper vending machine comprising an external housing, at least one display screen mounted relative to the external housing for customer access, a payment system associated with the machine, at least one printing device to print the wrapping paper, a cutting device to cut the printed paper to length, a roller mechanism to roll the printed paper, a labelling mechanism to apply a label to the printed and rolled paper, and a delivery chute into which the printed, rolled and labelled wrapping paper is delivered for customer removal from the machine.

19 Claims, 3 Drawing Sheets

PRINT-ON-DEMAND BESPOKE WRAPPING PAPER VENDING MACHINE

CROSS-REFERENCE TO RELATED APPLICATION

This application claims priority to and the benefit of United Kingdom Patent Application No. 2009867.9, filed Jun. 29, 2020, which is incorporated herein by reference.

TECHNICAL FIELD

The present disclosure relates generally to the field of vending machines. In particular, but not exclusively, this disclosure concerns a vending machine for on demand printing and dispensing a roll of bespoke wrapping paper.

BACKGROUND

Traditional retail shops supply gift wrapping paper, printed in factories, in bulk. This type of wrapping paper is not usually personalised in any way, typically printed with a myriad of standard patterns.

Online personalised gift-wrapping paper printing services already exist. These services typically offer a user with the opportunity to design their own pattern to be applied to the paper which is then printed, and dispatched. The finished bespoke paper is not instantly printed or received. It is printed and packaged in a centralised warehouse before being delivered to the end consumer by postal services several days after their order is placed.

A key cutting system embodied in a fully enclosed, automated vending kiosk, is also available.

IconX™ provides the My Key Machine which is an automated kiosk which includes a scanning device with which the customer scans the key to be copied, a payment device to receive the customer's payment (either contactless or cash) and then the copy key is cut within the kiosk from a store of blanks, and dispensed to the customer.

Embodiments of the subject disclosure seek to at least partially overcome or ameliorate any one or more of the abovementioned disadvantages or provide the consumer with a useful or commercial choice.

SUMMARY

According to a first aspect of the subject technology, there is provided a print on demand bespoke wrapping paper vending machine comprising an external housing, at least one display screen mounted relative to the external housing for customer access, a payment system associated with the machine, at least one printing device to print the wrapping paper, a cutting device to cut the printed paper to length, a roller mechanism comprising more than one roller spaced from one another to define a roll space within which the printed paper is rolled, a labelling mechanism to apply a label to the printed and rolled paper, and a delivery chute into which the printed, rolled and labelled wrapping paper is delivered for customer removal from the machine.

According to a second aspect of the subject technology, there is provided a method of printing on demand bespoke wrapping paper using a vending machine comprising an external housing, at least one display screen mounted relative to the external housing for customer access, a payment system associated with the machine, at least one printing device to print on the wrapping paper, a roller mechanism comprising more than one roller spaced from one another to define a roll space within which the printed paper is rolled, a cutting device to cut the printed paper to length, a labelling mechanism to apply a label to the printed and rolled paper and a delivery chute into which the printed, rolled and labelled wrapping paper is delivered for customer removal from the machine, the method comprising the steps of:
 a) Prompting a user to choose a paper length;
 b) Prompting a user to provide one or more images to be printed onto the paper;
 c) Preparing and presenting a sample artwork of the bespoke paper using the one or more image;
 d) Receiving payment for printing;
 e) Printing the paper with the artwork from a roll of stock paper in the vending machine;
 f) Cutting the printed paper from the roll of stock paper to create a length of bespoke printed paper;
 g) Rolling the length of bespoke printed paper;
 h) Applying at least one label to the rolled length of bespoke printed paper; and
 i) Dispensing the labelled, rolled length of bespoke printed paper for user collection.

Providing a print-on-demand bespoke wrapping paper vending machine allows the receipt/selection of one or more images or patterns, and a desired length of paper and then the machine can print the paper on-demand, roll the printed paper, label the printed and rolled paper and dispense it for customer collection, typically within 1-5 minutes.

The vending machine may further comprise an on-board supply of stock wrapping paper onto which the machine can print. The on-board supply will normally be in the form of at least one roll. Preferably a single roll of paper is provided. The preferred roll is provided in a single base colour or shade or tone. In an embodiment, the roll of blank paper is 610 mm in width and approximately 250 m in length. The 610 mm width tends to be a standard width for wrapping paper. A roll of paper with a different width and/or different length may be used.

The stock wrapping paper may be blank or pre-printed with a pattern.

The vending machine of the subject technology preferably includes an external housing. The external housing may be of any shape. A generally rectangular shape is preferred.

The external housing is generally a free-standing housing. The external housing will typically comprise at least one and typically at least two feet. Four feet in total are normally provided. The feet may have any configuration.

The external housing may include a weighted base. This may assist in providing the housing with stability, particularly if one or more weighty components of the vending machine and/or consumables, for example the roll of stock paper, are provided in an elevated position in the housing.

The preferred generally rectangular external housing has a base wall, a top wall, a rear wall and a pair of opposed sidewalls. The front of the external housing will preferably be provided with at least one access door.

In an embodiment, a pair of access doors are provided as the front wall of the external housing. One of the doors will typically be a larger door, occupying at least 50% of the width of the front external housing, preferably up to approximately 90% of the width of the external housing. A second, smaller door is preferably provided to span the remainder of the width of the front of the external housing.

A display cabinet portion may be provided on the smaller door to display one or more samples of printed wrapping paper that can be created using the vending machine.

The at least one access door will preferably be lockable. Typically, the at least one door will be lockable or latchable relative to a chassis or frame member. If more than one door is provided, one of the doors may be latchable relative to a chassis or frame member and the other door may be lockable relative to the latched door. One of the doors may sandwich a portion of one or more other doors to the housing before it is locked or latched.

One or more side access doors and/or one or more rear doors may be provided in one of the side walls and/or rear wall. The provision of a side access door will typically allow a new roll of blank paper to be loaded into the vending machine easily, but replacement of the paper may be achieved through the front access door(s).

Each of the walls will preferably include at least one substantially planar sheet member which is mounted relative to a preferred chassis or frame. The chassis or frame will typically be formed from more than one chassis or frame member attached together to form a substantially rectangular frame, relative to which the walls can be formed. The chassis or frame members will preferably be the main structural elements of the external housing with the at least one substantially planar sheet member provided to close open spaces between the chassis or frame members.

The working components of the vending machine, except where necessary as will become clear from this description, will preferably be mounted relative to the chassis or frame internally of the external housing. This will allow the structural chassis or frame members of the housing to bear the weight of the components.

The at least one display screen is preferably mounted relative to the front door/wall, in an upper region to be more or less at eye level. If a larger and a smaller front access door are provided, the at least one display screen is preferably mounted relative to the larger of the two doors, approximately centrally across the width of the vending machine.

A delivery chute is preferably provided in a lower region of the front wall/door. An access door to the delivery chute is typically provided. The access door is normally hinged relative to an upper edge and swings inwardly into the delivery chute only.

A payment device or portion of a payment device is typically mounted relative to the front door/wall of the external housing. The payment device or portion of a payment device is preferably provided in an upper region, typically adjacent to the display screen.

In an embodiment, the external housing may be provided with one or more transparent walls or wall portions so that a customer can view the inner workings of the vending machine while printing.

The vending machine typically includes at least one display screen mounted relative to the external housing for customer access. The at least one display screen is preferably a touchscreen as this will allow the use of the at least one display screen as both a display and as an input/control device with which the customer can enter their desired parameters for the printed wrapping paper. It may therefore function as a multifunction user interface.

The at least one display screen will typically be mounted within/relative to the front wall/door of the external housing. The at least one display screen may be provided with a transparent cover member to protect the at least one display screen but to still allow visibility and use.

The at least one display screen is typically connected to or in communication with a controller to control the function/operation of the vending machine.

The vending machine may use the roller mechanism to advance the paper through the process steps of the vending machine or alternatively, the at least one printing device may advance the paper from the preferred stock roll through the printing process to the roller mechanism which can then advance the paper through the roller, labelling and delivery process steps.

Preferably the wrapping paper is printed and then cut to length prior to the rolling step. The wrapping paper may be trimmed to length either contemporaneously with the cutting or after the wrapping paper has been cut from the preferred stock roll. If the wrapping paper is trimmed, the trimmed-off portion is preferably stored within the vending machine in a trimmed waste paper bin for later disposal.

A forward end of the cut wrapping paper is preferably fed to the roller mechanism to be rolled.

The at least one display screen may show the progress of the printing process thereon. The progress may be displayed in real-time.

The at least one display screen may display an estimated completion time.

Typically, once the printing step of the process has been initiated, it cannot be stopped by customer. It is therefore typical that the payment occur before printing commences.

The at least one display, preferably being a display and input/control interface, preferably allows the customer to control the design and/or printing process.

The vending machine may be provided with at least one input port for attachment/insertion of a data storage device, such as a USB flash drive or memory card for example, to allow a customer to upload/provide information or media to the vending machines. This may be achieved wirelessly from a device such as a smartphone or table for example instead of via attachment/insertion of a data storage device.

The at least one display screen may be associated with any one or more additional input and/or control devices such as a trackball or mouse or keyboard for example to give a customer more or additional or alternative input and/or control devices.

The vending machine may comprise a payment system associated with the machine. The payment system is preferably associated with the at least one controller controlling the vending machine. At least one portion of the payment system may be on-board the vending machine and/or one or more portions of the payment system may be remotely located and associated/connected to or with the vending machine.

Typically, the payment system comprises a card reader for electronic payments mounted on the vending machine, preferably on an external wall of the housing.

The payment system will typically seek cleared payment before printing of the wrapping paper commences. This may involve seeking and receiving authorisation for payment from a provider such as a credit provider or bank for example.

The payment system will typically be associated with a wired or wireless communication component allowing communication with one or more remote sources in order to obtain authorisation for payments.

A cash and/or coin payment module may be provided but this will add to the size and complexity of the vending machine and is less preferred.

The vending machine may comprise at least one printing device to print the wrapping paper. At least one large scale commercial colour printer is preferably provided. The printing device preferably uses fast drying ink or similar in order to minimise the time to delivery of the wrapping paper, particularly because the wrapping paper is to be rolled after printing and prior to dispensing.

The printing device will preferably suit the stock paper supply of the vending machine. Given the more or less standard width of wrapping paper, the printing device will preferably print on paper which is that width. A preferred width is 610 mm.

The at least one printing device is preferably located in an upper portion of the housing allowing gravity to feed the printed paper to the roller mechanism.

The at least one printing device is typically controlled by the preferred controller and printed the final artwork that the customer has approved.

Any type of printing device may be used. Typically, a single printing device is used but more than one printing device could be used, for example to print different colours for example. The printing device is preferably a high-quality printing device.

The vending machine preferably comprises a cutting device to cut the printed paper to length. The cutting device is preferably located between the at least one printing device and the roller mechanism. The wrapping paper is preferably cut before it is rolled. The cutting device is preferably located to cut the wrapping paper to the desired length after it exits the at least one printing device, leaving the at least one printing device already prepared to print the next piece of bespoke wrapping paper.

Any type of cutting device may be used. For example, a reciprocally travelling blade may be provided. The blade may be driven across the width of the paper to separate the printed wrapping paper from the stock roll of paper.

A guillotine style cutting device may be provided. In this embodiment, a guillotine blade may be provided with which moves perpendicularly to the paper to cut it.

The cutting device may cut relative to a guide provided adjacent to the cutting blade to provide a clean cut, minimising tearing of the paper.

The vending machine preferably comprises a roller mechanism to roll the printed paper. Preferably, after the printed paper is completed and cut from the roll, the paper is delivered to the roller mechanism. Preferably, a forward edge of the printed paper is delivered to the rolling mechanism and the roller mechanism then draws the length of printed paper into the roller mechanism as it is rolled.

The paper may be delivered to the roller mechanism in any way, preferably using gravity.

The roller mechanism preferably comprises one or more rollers. Typically, more than one roller is provided. At least one roller will preferably curve the forward edge of the printed paper so that rolling can commence. Preferably, the paper is rolled between the rollers rather than around a roller as this will make removal of the rolled paper more difficult.

Where more than one roller is provided, the rollers will typically be spaced apart. The rollers will normally be mounted on axes which are parallel to one another.

The at least one roller may be solid or hollow. The at least one roller may have a continuous peripheral surface or not. The at least one roller may include a core to allow mounting of the roller with a number of fins radiating from the core. The fins may be annular to extend in a plane substantially parallel to the ends of the roller. The fins may be planar and extend radially outwardly from the core. The fins may be arcuate when viewed from the end of the roller. Whatever the configuration of the fins, the configuration will preferably minimise contact with the printed paper.

The outer edge(s) of a roller will preferably be coplanar or aligned. The outer edge of the fins is preferably thin to minimise the contact area with the printed paper.

In an embodiment, four spaced apart rollers are provided as the rolling mechanism. The preferred four rollers are preferably all mounted to be parallel with one another and define a central rolling space between them in which the printed paper is rolled. The preferred four rollers are mounted in a substantially rectangular array.

Any one or more of the rollers are driven rollers, typically all of them, to roll the paper.

One or more of the rollers may be mounted for movement relative to one or more of the other rollers. The one or more movable rollers may be biased into a rolling position.

The one or more movable rollers may be actively moved into a rolling position, and a release position to create a large gap between at least two of the rollers to release the rolled paper, by a drive mechanism or similar.

The rollers preferably extend substantially transversely within the external housing. The rollers preferably extend substantially parallel to the front wall of the external housing. The rollers preferably extend substantially parallel to the delivery chute. The roller mechanism is preferably located beneath the outlet end of the at least one printing device and above the delivery chute. This will preferably allow gravity to cause the entry of the printed paper into the rolling mechanism and upon exit from the rolling mechanism, release the rolled paper to the delivery chute.

The printed paper is preferably rolled with the printed side outermost.

The vending machine preferably comprises a labelling mechanism to apply a label to the printed and rolled paper. Typically, a sensor may be provided to determine when the paper is rolled. The sensor may locate the outer free end of the rolled paper. The labelling mechanism preferably applies at least one label to the outer free end to fix the free end of the roll to the adjacent paper of the roll to secure the free end thereto.

The at least one label is preferably an adhesive label. The at least one label preferably spans a portion of the free end of the rolled paper. The at least one label may be a spot label (or any shape) or a ring for example that encircles the rolled paper.

One or more label may be provided over the width of the rolled paper. Possibly, a single label may be provided over the whole width of the free end of the rolled paper as this may minimise the chance of the paper tearing during the delivery portion of the process.

A roll of labelling material may be provided as well. The roll of labelling material may be the label (and cut to length for application to the rolled paper) or alternatively may be a carrier for a plurality of labels which are removed from the carrier and applied to the rolled paper.

The labelling mechanism is preferably provided below the rolling mechanism. the rolled paper may be labelled whilst still in the rolling mechanism. Preferably, once labelled, the roll of printed paper is released to the delivery chute. This may be achieved by moving at least one of the rollers.

A guide may be provided to guide the rolled paper to the delivery chute. Typically, the rolled paper will fall from the rolling mechanism to the delivery chute, typically remaining substantially parallel to the front wall of the vending machine as it travels.

As mentioned above, the delivery chute into which the printed, rolled and labelled wrapping paper is delivered for customer removal from the machine, typically has an associated door to allow access for the customer to collect their printed and rolled paper. The door will preferably be a swing door. The door will preferably allow access to the delivery chute for collection and prevent access to the internal components of the vending machine.

The vending machine will typically be powered, preferably connected to mains power.

The vending machine will preferably be a free-standing machine. Provision of the preferred wireless communication with the machine will mean that the machine can simply be located where required and connected to a power source to allow operation. The operation of the machine will typically be monitored remotely and appropriate fault detection or low paper supply sensor(s) will normally be provided.

As will be clear from the above, the vending machine will normally comprise a controller to control operation of the machine and its components. The controller will typically also be configured to communicate with a remote system administrator and/or one or more financial institutions. The system administrator will preferably monitor the machine and upgrade and/or refill the machine as necessary to ensure independent operation in the field.

The at least one display screen is preferably an electronic device, which generates and displays at least one interface thereon according to operating instructions from a software application to control the printing process. Through customer interaction with this software application, the customer will typically provide their instructions as to the wrapping paper they desire. A secondary software application may be available for a user device such as a smartphone or tablet and which the user can user to design their preferred wrapping paper and then upload this to the software application operating on the vending machine.

The at least one display screen may present the customer with a number of possible designs for selection by the customer. The customer may provide one or more images and/or patterns to the vending machine, which once provided, are preferably displayed on the at least one display screen. The provision may be accomplished in any way. Wireless provision is preferred but customer information or preferences and/or one or more images and/or patterns may be provided to the vending machine via attachment of a data storage device to an appropriate port on the vending machine to facilitate transfer of information.

The operating software will typically prompt the customer to provide or select their desired dimensions of wrapping paper. Preferably, the width of the wrapping paper is set from the width of the roll of blank paper provided in the machine and so the length may be the only dimension required.

Once the one or more images and/or patterns are present in the vending machine and the dimension of the desired wrapping paper has been designated by the customer, an electronic rendering of the one or more images and/or patterns on the desired size wrapping paper, as one or more digital images may be generated and displayed on the at least one display. This may form a base artwork for consideration and/or manipulation for the customer.

The generation of the base artwork will preferably allow the customer to enter text if desired to be printed onto the wrapping paper. Preferably, the customer will use the at least one display screen to input text if desired. The preferred controller and/or software application will typically generate a virtual keyboard on the at least one display screen is the customer indicates to the vending machine that text entry is desired.

The customer can also preferably utilise the at least one display screen and the preferred software application of the vending machine to adjust parameters of the base artwork and/or manipulate the base artwork to arrive at a final artwork for printing. Parameters may include brightness, contrast, colour, text position, text content and/or pattern or image content and/or position.

Once the customer has arrived at what they consider to be the final artwork for printing, the preferred software application may generate and display a preview of the bespoke paper on the at least one display screen and request final confirmation.

The design portion described above may be embodied in a software application that operates on a computer device separate from the vending machine such as an application for a smartphone or similar, using which the customer may design their bespoke wrapping paper and then take to the vending machine, and upload to the vending machine for printing.

Once the final artwork has been confirmed, the software application (whether on the vending machine or on the application for a smartphone or similar) will typically request payment, usually by generating and displaying an interface on the at least one display screen. Once payment is made, the vending machine will preferably print the bespoke wrapping paper.

The wrapping paper is preferably printed, rolled, cut and labelled prior to being dispensed into the delivery chute.

DETAILED DESCRIPTION OF PREFERRED EMBODIMENTS

In order that the subject technology may be more clearly understood one or more embodiments thereof will now be described, by way of example only, with reference to the accompanying drawings, of which:

Figure 1:
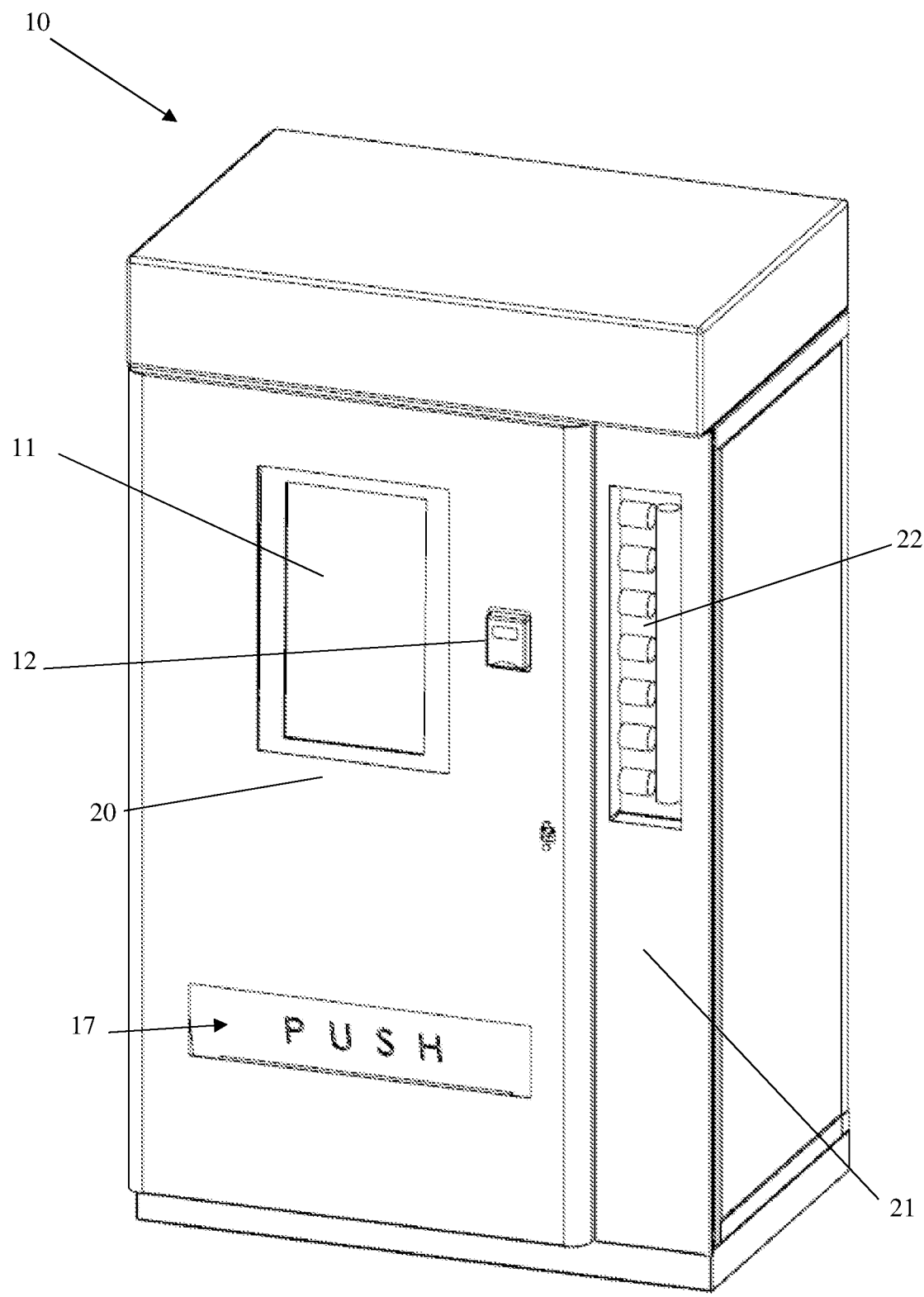
FIG. 1 is an isometric front view of a bespoke wrapping paper vending machine according to an embodiment.

With reference to the accompanying figures, a print on demand bespoke wrapping paper vending machine 10 comprising an external housing, an electronic touchscreen 11 mounted relative to the external housing for customer access, and an electronic payment reader mounted relative to a wall of the external housing 10. Internally, the vending machine 10 illustrated in FIGS. 2 and 3 includes a printer 13 to print the wrapping paper, a cutting device 14 to cut the printed paper to length, a roller mechanism 15 to roll the printed paper, a labelling mechanism 16 to apply a label to the printed and rolled paper, and a delivery chute 17 into which the printed, rolled and labelled wrapping paper is delivered for customer removal from the machine 10.

Figure 3:
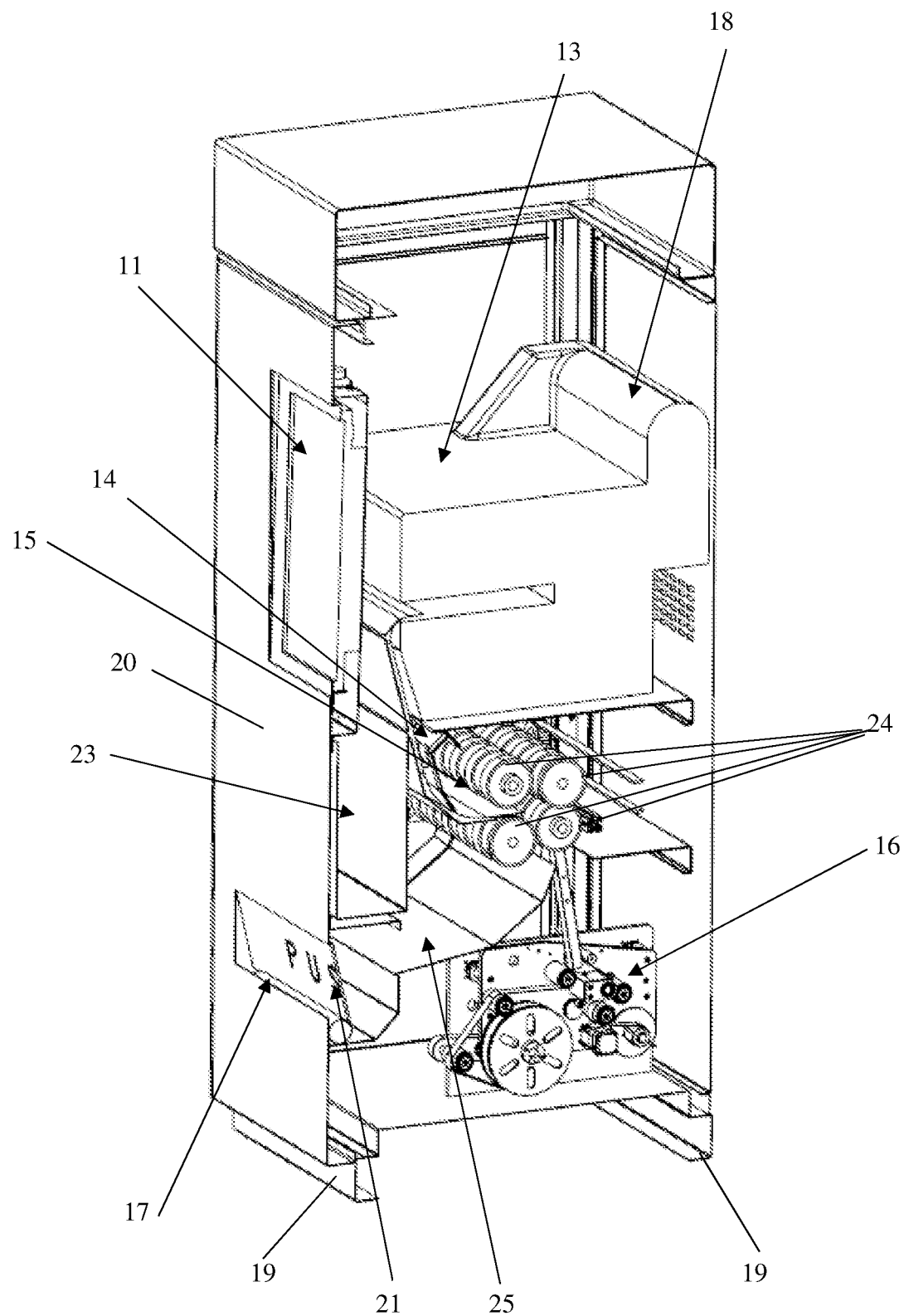
FIG. 3 is an isometric section view of the internal workings of the bespoke wrapping paper vending machine illustrated in FIG. 2 along line A-A.

The vending machine 10 will normally include an on-board supply of blank wrapping paper which in the illustrated embodiment is in the form of a roll. The preferred roll is provided in a single base colour or shade or tone. In an embodiment, the roll of blank paper is 610 mm in width and approximately 250 m in length. The 610 mm width tends to be a standard width for wrapping paper. In FIG. 3, the roll is located to the rear side of the internal volume of the housing, above the printer 13 in a roll housing 18.

As shown in FIG. 1 in particular, the vending machine 10 preferably includes an external housing. A generally rectangular shape is preferred.

The external housing is generally a free-standing housing. The external housing illustrated includes a number of elongate feet 19 to spread the load and assist in providing the housing with stability, particularly if one or more weighty components of the vending machine and/or consumables, for example the roll of blank paper and the printer 13 which are provided in an elevated position within the housing.

As shown, the generally rectangular external housing has a base wall, a top wall, a rear wall and a pair of opposed sidewalls. The front of the external housing will preferably be provided with access doors.

Figure 2:
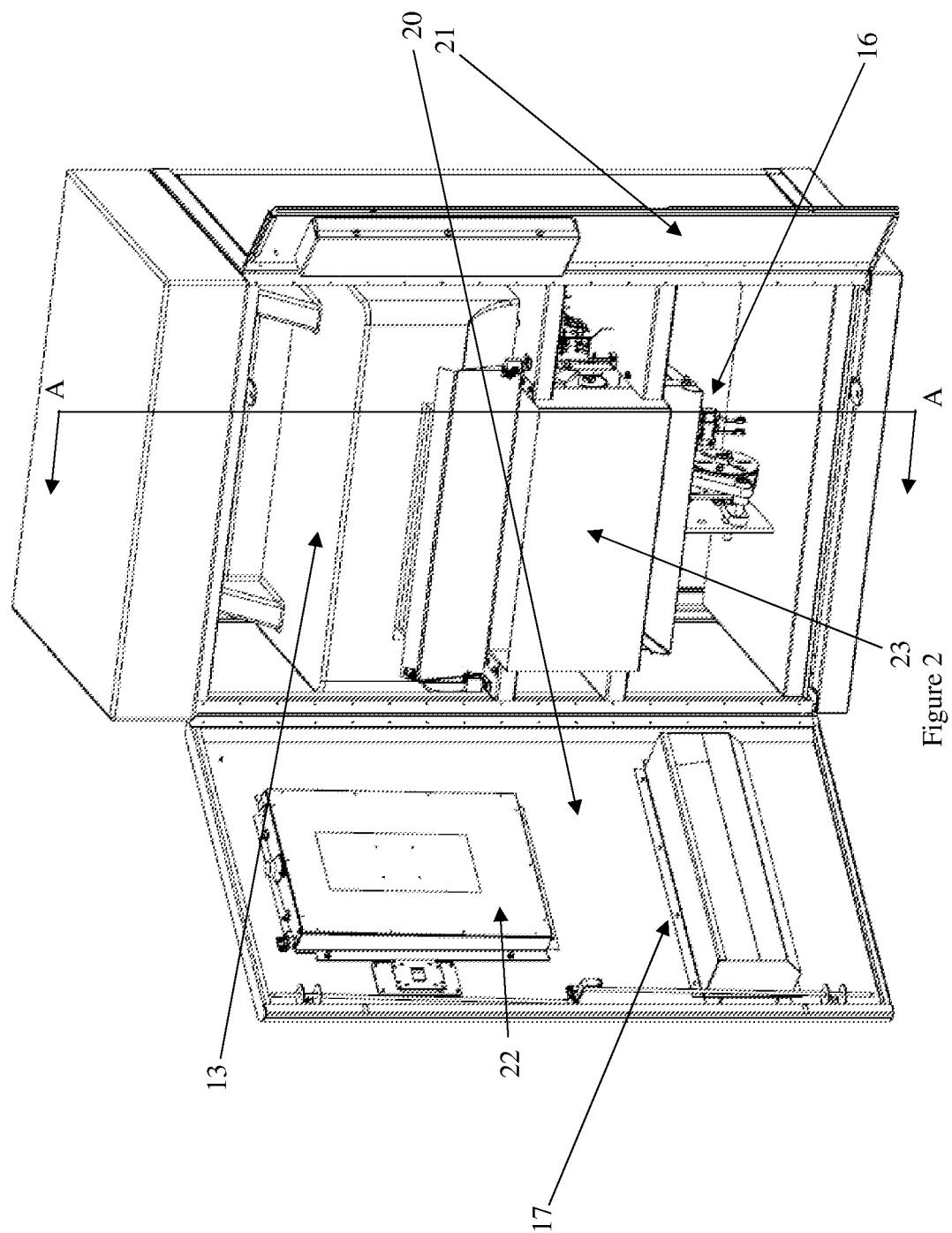
FIG. 2 is an isometric view of the bespoke wrapping paper vending machine illustrated in FIG. 1 with the access doors open.

In the embodiment shown in FIGS. 1 and 2, a pair of access doors are provided as the front wall of the external housing. One of the doors is a larger door 20, occupying approximately 90% of the width of the front external housing. A second, smaller door 21 is provided to span the remainder of the width of the front of the external housing. A display cabinet portion 22 is provided on the smaller door 21 to display samples of printed wrapping paper that can be created using the vending machine 10.

The access doors are lockable. Typically, the smaller door 21 is provided with a flange and is closed first and the larger door 20 overlaps the flange when the doors are closed and then locked relative to the lower forward foot 19 and an upper structural member using a multipoint lock having a central lock with a pair of elongate shoot bolts as shown in FIG. 2.

Each of the walls will preferably include at least one substantially planar sheet member which is mounted relative to a preferred chassis or frame. The chassis or frame will typically be formed from more than one chassis or frame member attached together to form a substantially rectangular frame, relative to which the walls can be formed. The chassis or frame members will preferably be the main structural elements of the external housing with the at least one substantially planar sheet member provided to close open spaces between the chassis or frame members.

The touch screen 11 is mounted relative to the front door 20 in an upper region to be more or less at eye level for a customer, approximately centrally across the width of the vending machine.

The delivery chute 17 is provided in a lower region of the front door 20. An access door 21 to the delivery chute 17 is typically provided. The access door is normally hinged relative to an upper edge and swings inwardly into the delivery chute only.

The payment reader 12 is also mounted relative to the front door 20, in an upper region, typically adjacent to the touch screen 11.

The provision of a touchscreen 11 will allow the use of the touch screen as both a display screen and as an input/control device with which the customer can enter their desired parameters for the printed wrapping paper.

The touch screen of the illustrated embodiment is mounted in a recess in the front door 20 defined by an inner portion 22 shown in FIG. 2 provided with a transparent cover member on an outer side to protect the touch screen 11 but to still allow visibility and use.

The touch screen 11 is typically connected to or in communication with a controller to control the function/operation of the vending machine 10.

In the illustrated embodiment, the wrapping paper is printed and then cut to length prior to the rolling step. The wrapping paper may be trimmed to length either contemporaneously with the cutting or after the wrapping paper has been cut from the stock roll. If the wrapping paper is trimmed, the trimmed portion is preferably stored within the vending machine in a trimmed paper bin 23 for later disposal.

Although not shown, the vending machine 10 may be provided with at least one input port for attachment/insertion of a data storage device, such as a USB flash drive or memory card for example, to allow a customer to upload/provide information or media to the vending machines. Alternatively, his may be achieved wirelessly, for example from a software application operating on a customer smartphone for example.

The payment system is preferably associated with the at least one controller controlling the vending machine 10. As illustrated, the payment system comprises a card reader 12 for electronic payments mounted on the vending machine 10. The card reader 12 may connect with one or more portions of the payment system remotely located from the vending machine to obtain authorisation for payments submitted by customers.

The payment system will typically seek cleared payment before printing of the wrapping paper commences. This may involve seeking and receiving authorisation for payment from a provider such as a credit provider or bank for example. The card reader of the payment system will typically be associated with a wired or wireless communication component allowing communication with one or more remote sources in order to obtain authorisation for payments.

A large-scale commercial colour printer 13 is provided within the housing. The printer 13 preferably uses fast drying ink in order to minimise the time to delivery of the wrapping paper, particularly because the wrapping paper is to be rolled after printing and prior to dispensing.

As illustrated in FIGS. 2 and 3, the printer 13 is located in an upper portion of the internal volume of the housing, allowing gravity to feed the printed paper to the roller mechanism 15.

The printer 13 is typically controlled by the on-board controller and prints the final artwork that the customer has approved.

The cutting device 14 is shown located between the printer 13 and the roller mechanism 15. In this embodiment, the wrapping paper is cut before it is rolled. The cutting device is preferably located to cut the wrapping paper to the desired length after it exits the printer 13, leaving the printer 13 already prepared to print the next piece of bespoke wrapping paper. Normally, the cutter will cut the paper as close as possible to the exit from the printer 13 as this may minimise paper waste.

Any type of cutting device may be used. For example, a reciprocally travelling blade may be provided. The blade may be driven across the width of the paper to separate the printed wrapping paper from the base or stock roll of paper. The cutting device my cut relative to a guide or support provided adjacent to the cutting blade to ensure a clean cut, minimising tearing of the paper.

After the printing of the paper is completed and the printed paper is cut from the remainder of the roll, the printed paper is preferably delivered to the roller mechanism 15. In the illustrated embodiment, a forward edge of the printed paper is delivered to the roller mechanism 15 and the roller mechanism 15 then draws the length of printed paper into the roller mechanism 15 as it is rolled.

In the illustrated embodiment, four spaced apart rollers 24 are provided as the rolling mechanism 15. The four rollers are all mounted to be parallel with one another and define a central rolling space between them in which the printed paper is rolled. The four rollers 24 are mounted in a substantially rectangular array. Any one or more of the rollers are driven rollers, typically all of them, to roll the paper.

At least one roller 24 will preferably curve the forward edge of the printed paper so that rolling can commence. Preferably, the paper is rolled between the rollers 24 as shown rather than around a roller as this will make removal of the rolled paper more difficult.

As shown in FIG. 3, the rollers include a core to allow mounting of the roller, with a number of fins radiating from the core. The fins are annular to extend in a plane substantially parallel to the ends of the roller. This configuration will preferably minimise contact with the printed paper. The printed paper is preferably rolled with the printed side outermost.

The outer edges of the fins of each roller 24 will preferably be coplanar or aligned with the outer edges of the fins on that roller. The outer edge of the fins is preferably thin to minimise the contact area with the printed paper.

One or more of the rollers may be mounted for movement relative to one or more of the other rollers. The one or more moving rollers may be actively moved into a rolling position, such as by a drive mechanism or similar and into a release position to allow the rolled paper to exit the roller mechanism 15. Normally, the forward, lower roller will be movable toward the front of the machine 10 to create a gap to release the rolled paper to fall into the delivery chute 17.

As illustrated, the rollers 24 extend substantially transversely within the external housing, substantially parallel to the front wall of the external housing and substantially parallel to the delivery chute 17. The roller mechanism 15 is preferably located beneath the outlet end of the at printer 13 and above the delivery chute 17. This will allow gravity to cause the entry of the printed paper into the rolling mechanism 15 and upon exit from the rolling mechanism 15, dispensing the rolled paper to the delivery chute 17.

As shown, a guide 25 is provided to guide the rolled paper to the delivery chute 17. Typically, the rolled paper will fall from the roller mechanism 15 to the delivery chute 17, typically remaining substantially parallel to the front wall of the vending machine 10 as it travels.

Typically, a sensor is provided to determine when the paper is rolled in the rolling mechanism 15. The sensor may locate the outer free end of the rolled paper. The labelling mechanism 16 preferably applies at least one label to the free end of the rolled paper to fix the free end of the roll to the adjacent paper of the roll to secure the free end thereto.

The at least one label is preferably an adhesive label. The at least one label may be a spot label (or any shape) or a ring for example that encircles the rolled paper.

One or more label may be provided over the width of the rolled paper. A roll of labelling material may be provided as well. The roll of labelling material may be the label or alternatively may be a carrier for a plurality of spot labels.

As shown, the labelling mechanism 16 is provided below the rolling mechanism 15. The rolled paper is preferably labelled whilst still in the rolling mechanism 15. Preferably, once labelled, the roll of printed paper is released to the delivery chute 17.

As mentioned above, the delivery chute 17 into which the printed, rolled and labelled wrapping paper is delivered for customer removal from the machine 10, has an associated door 21 to allow access for the customer to collect their printed and rolled paper. In the illustrated embodiment, the door 21 is a swing door, hinged at an upper edge. The door 21 will preferably allow access to the delivery chute 17 for collection and prevent access to the internal components of the vending machine 10.

The vending machine 10 will typically be powered and connected to mains power.

The vending machine 10 shown is a free-standing machine. Provision of the preferred wireless communication with the machine will mean that the machine can simply be located where required and connected to a power source allowing operation. The operation of the machine 10 will typically be monitored remotely and appropriate fault detection or low paper supply sensor(s) will normally be provided.

As will be clear from the above, the vending machine 10 normally comprises a controller to control operation of the machine and its components. The controller will typically also be configured to communicate with a remote system administrator and/or one or more financial institutions. The system administrator will preferably monitor the machine and upgrade and/or refill the machine as necessary to ensure independent operation in the field.

In use, the vending machine will preferably print bespoke wrapping paper by
a) Prompting a user to choose a paper length;
b) Prompting a user to provide one or more images to be printed onto the stock of paper provided within the vending machine 10;
c) Allowing the customer to prepare their desired bespoke wrapping paper and presenting a sample artwork of the bespoke paper including the one or more image to the customer for review and approval;
d) Requesting and receiving payment for the printing;
e) Printing the paper with the artwork approved by the customer from a roll of stock paper in the vending machine 10;
f) Cutting the printed paper from the roll of stock paper to create a length of bespoke printed paper,
g) Rolling the length of bespoke printed paper;
h) Applying at least one label to the rolled length of bespoke printed paper; and
i) Dispensing the labelled, rolled length of bespoke printed paper for user collection.

The touch screen 11 is preferably an electronic device, which generates and displays at least one interface thereon according to operating instructions from a software application to receive customer material and selections and control the printing process. Through customer interaction with this software application via the touch screen 11, the customer will typically provide their instructions as to the attributes of the wrapping paper they desire. A secondary software application may be available for a user device such as a smartphone or tablet and which the user can user to design their preferred wrapping paper and then upload this to the software application operating on the vending machine 10.

The touchscreen screen may present the customer with a number of possible designs for selection by the customer. The customer may provide one or more images and/or patterns to the vending machine 10, which once provided, are preferably displayed on the touch screen 11. Wireless provision of customer images/patterns is preferred but customer information or preferences and/or one or more images and/or patterns may be provided to the vending machine 10 via attachment of a data storage device to an appropriate port on the vending machine to facilitate transfer of information.

The operating software will typically prompt the customer to provide or select their desired dimensions of wrapping paper. Preferably, the width of the wrapping paper is set from the width of the roll of paper provided in the machine 10 and so the length may be the only dimension required.

Once the one or more images and/or patterns are present in the vending machine 10 and the dimension of the desired wrapping paper has been designated by the customer, an electronic rendering of the one or more images and/or patterns on the desired size wrapping paper, as one or more digital images may be generated and displayed on the touch screen 11. This may form a base artwork for consideration and/or manipulation for the customer.

The generation of the base artwork will preferably allow the customer to enter text if desired to be printed onto the wrapping paper. Preferably, the customer will use the touchscreen 11 to input text if desired. The preferred controller and/or software application will typically generate a virtual keyboard on the touch screen 11 if the customer indicates that text entry is desired.

The customer can also preferably utilise the touchscreen 11 and the preferred software application of the vending machine to adjust parameters of the base artwork and/or manipulate the base artwork to arrive at a final artwork for printing. Parameters may include brightness, contrast, colour, text position, text content and/or pattern or image content and/or position.

Once the customer has arrived at what they consider to be the final artwork for printing, the preferred software application may generate and display a preview of the bespoke paper on the touchscreen 11 and request final confirmation.

The design portion described above may be embodied in a software application that operates on a computer device separate from the vending machine such as an application for a smartphone or similar, using which the customer may design their bespoke wrapping paper and then take to the vending machine, and upload to the vending machine for printing.

Once the final artwork has been confirmed, the software application (whether on the vending machine or on the application for a smartphone or similar) will typically request payment, usually by generating and displaying an interface on the touchscreen 11. Once payment is made, the vending machine will preferably print the bespoke wrapping paper.

The touchscreen 11 may show the progress of the printing process thereon. The progress may be displayed in real-time. The touchscreen 11 may display an estimated completion time.

Typically, once the printing step of the process has been initiated, it cannot be stopped by customer. It is therefore typical that the payment occur before printing commences.

The wrapping paper is preferably printed, rolled, cut and labelled prior to being dispensed into the delivery chute 17 for collection.

The one or more embodiments are described above by way of example only. Many variations are possible without departing from the scope of protection afforded by the appended claims.

The invention claimed is:

1. A print-on-demand bespoke wrapping paper vending machine comprising:
   an external housing;
   at least one display screen mounted relative to the external housing for customer access;
   a payment system associated with the machine;
   at least one printing device to print the wrapping paper;
   a cutting device to cut the printed paper to length;
   a roller mechanism comprising four rollers mounted parallel to one another and spaced from one another to define a central rolling space between the four rollers within which the printed paper is rolled;
   a labelling mechanism to apply a label to the printed and rolled paper; and
   a delivery chute into which the printed, rolled and labelled wrapping paper is delivered for customer removal from the machine.

2. The print-on-demand bespoke wrapping paper vending machine as claimed in claim 1, further comprising an on-board supply of stock wrapping paper onto which the machine can print.

3. The print-on-demand bespoke wrapping paper vending machine as claimed in claim 1, further comprising a display cabinet portion provided on an exterior of the external housing.

4. The print-on-demand bespoke wrapping paper vending machine as claimed in claim 1, wherein the at least one display screen is a touchscreen to function as both a display and as an input/control device with which the customer can enter their desired parameters for the printed wrapping paper.

5. The print-on-demand bespoke wrapping paper vending machine as claimed in claim 1, further comprising at least one input port for attachment/insertion of a data storage device to allow a customer to upload/provide information or media to the vending machine.

6. The print-on-demand bespoke wrapping paper vending machine as claimed in claim 1, further comprising a wireless communication device to allow information to be transmitted wirelessly to and/or from the vending machine.

7. The print-on-demand bespoke wrapping paper vending machine as claimed in claim 1, wherein the cutting device is located between the at least one printing device and the roller mechanism so that the wrapping paper is preferably cut before it is rolled.

8. The print-on-demand bespoke wrapping paper vending machine as claimed in claim 1, wherein the roller mechanism is located below the at least one printing device.

9. The print-on-demand bespoke wrapping paper vending machine as claimed in claim 1, wherein at least one roller includes a core to allow mounting of the roller with a number of annular fins radiating from the core.

10. The print-on-demand bespoke wrapping paper vending machine as claimed in claim 1, wherein any one or more of the rollers are driven rollers to roll the paper.

11. The print-on-demand bespoke wrapping paper vending machine as claimed in claim 1, wherein one or more of the rollers is a movable roller mounted for movement relative to one or more of the other rollers to be moved into a rolling position, and a release position to create a gap between at least two of the rollers to release the rolled paper.

12. The print-on-demand bespoke wrapping paper vending machine as claimed in claim 1, wherein the least one roller curves a forward edge of the printed paper so that rolling can commence.

13. The print-on-demand bespoke wrapping paper vending machine as claimed in claim 1, wherein the rollers extend substantially transversely and substantially parallel to the delivery chute.

14. The print-on-demand bespoke wrapping paper vending machine as claimed in claim 1, wherein the labelling mechanism includes a sensor to locate the outer free end of the rolled paper when the paper is rolled.

15. The print-on-demand bespoke wrapping paper vending machine as claimed in claim 1, wherein the labelling mechanism is provided below the rolling mechanism.

16. A method of printing on demand bespoke wrapping paper using a vending machine, the method comprising the steps of:
   a. Prompting a user to choose a paper length;
   b. Prompting a user to provide one or more images to be printed onto the paper;
   c. Preparing and presenting a sample artwork of the bespoke paper using the one or more image;
   d. Receiving payment for printing;
   e. Printing the paper with the artwork from a roll of stock paper in the vending machine;
   f. Cutting the printed paper from the roll of stock paper to create a length of bespoke printed paper;
   g. Rolling the length of bespoke printed paper using a roller mechanism of the vending machine, the roller mechanism having four rollers mounted parallel to one another and spaced from one another to define a central rolling space between the four rollers within which the bespoke printed paper is rolled;
   h. Applying at least one label to the rolled length of bespoke printed paper; and
   i. Dispensing the labelled, rolled length of bespoke printed paper for user collection.

17. A method of printing on demand bespoke wrapping paper as claimed in claim 16, wherein a software application is provided to control the steps in the method, the software application causing the generation and display of at least one interface on the at least one display screen to control the printing method.

18. A method of printing on demand bespoke wrapping paper as claimed in claim 17, wherein a secondary software application is used by a user to design a preferred wrapping paper and then to interface with the software application operating on the vending machine to provide the preferred wrapping paper design to the vending machine.

19. A method of printing on demand bespoke wrapping paper as claimed in claim 16, wherein an electronic rendering of one or more images and/or patterns on a desired size wrapping paper is generated and displayed on the at least one display as one or more digital images.

* * * * *